Patented Sept. 5, 1933

1,925,204

UNITED STATES PATENT OFFICE 1,925,204

ART OF PRODUCING ACTIVATED CHARCOAL FROM NITROGENOUS MATERIAL

Gustave T. Reich, Drexel Hill, Pa.

No Drawing. Application November 17, 1930
Serial No. 496,347

9 Claims. (Cl. 252—3)

In the art of producing activated carbon hitherto a number of processes have been employed, both to secure the activation and to control the physical condition and structure of the activated carbon. The earliest method, probably, was the intimate mixing of cellulose material with a suitable inorganic activating agent, followed by heating and leaching out the inorganic material. On this basic method, a large amount of experimental work was done, using a large number of nitrogenous organic materials, starches, sugars, cellulose and other materials which were variously treated with a large number of inorganic agents that were introduced into these materials and mixed with them, subjected to heating and the inorganic matter leached out, wholly or partly.

It is known that activated carbons differ in physical structure and in hardness, and various methods have been employed in their production by which this phyical structure and degree of hardness desired is attained. This hardness and structure depend on a number of factors, such as the application of the heat, its temperature and various time factors. Activated carbon in one physical form is quite different from it in others and the different forms are suitable for different purposes.

Heretofore the controlling of the physical and structural condition of the carbon has not been performed prior to the time the activation chiefly was occurring.

Quite frequently the activating agents were partly or wholly driven out before activating.

The entire process of activating the carbon has heretofore been carried out generally in a single retort in which, also, frequently the production of the carbon from the organic material before activation was also carried out. No attempt was made to separate the process into its various stages and to adapt the process and the instrumentalities to cheap, efficient and convenient operation of the process and the devices suitable to its carrying out, by separating these stages. On the contrary, I separate the stages—adapting my process to such steps as are suitable to the best production of the activated carbon and the best utilization of the instrumentalities employed in its production.

My process utilizes as the activating agents the water soluble inorganic materials actually contained in crude carbon that may be produced from saccharine material such as sweet water, molasses, distilling slop, and many other similar substances. The agents are quite various, they include salts of the alkali and alkaline earth metals and other salts that are present in the saccharine material before the carbonization of it or may be formed by the neutralization of materials reacting acid. It appears that either the presence of a number of diverse inorganic salts in the unactivated or partly activated material, or the intimacy of the mixture of such salts with the carbon or both combined contribute largely to the results that I obtain. I may neutralize these salts to a somewhat greater isoelectric condition than pH³. Also, in practice, I may carry the inorganic material or a substantial part of it through all the various steps of the process, deferring either a part or all of the leaching until the activation of the carbon is completed.

Another of the features of my process that I use in practice is the use of gases saturated with water vapor during the activation, which may be used appropriately to the particular saccharine or similar material that is treated, at various stages of the activation process.

The successive main steps of my process are (a) The formation from a nitrogenous waste material of a carbon that is either wholly unactivated or only partly activated. (b) The activation of the carbon. The steps (a) and (b) are not always practiced together, and the step (b) especially may be practiced by using for the raw material for this step, any suitable carbon that contains in it activating agents that were originally in the nitrogenous waste materials from which the carbon was reduced.

As a matter of economy as well as for the best technique for carrying out the process, these two steps are carried out in practice in different retorts. I prefer to carry out the step (a) in two steps. In the first of them the water content is largely evaporated, and in the second the carbon is reduced. The step (b) preferably is carried out in a single retort, and at a much higher temperature. This permits the process to be carried out in successively smaller retorts, and the temperature of each retort to remain fairly constant, and a recovery of some desirable byproducts in concentrated form during the process, and the use of heat that otherwise would be wasted.

Describing now in detail one of the successive steps of the practice of my process in the best way of which I am actually aware.

The nitrogenous materials of the kind above described may be placed in a retort where they are concentrated by driving off the water content. These materials are very numerous, in the nitrogenous matter are contained alkaline or alkaline earth salts and often other inorganic salts and organic acids or some of these that form the activating agents and are water soluble.

These nitrogenous organic materials contain also, and usually, a considerable percentage of miscellaneous organic materials, usually mostly nitrogenous, among which are often gums, etc., which will furnish carbon under heat. This step may be carried out at any desired evaporating temperature, say up to 115° C. The amount of concentration varies with the varying amount of $H_2O$ contained. It is often about 20% depending upon its isoelectric point. The higher its isoelectric point, the greater the density, consequently the lower its water content. This step may be varied by fermenting the sugar content wholly or in part, utilizing the non-sugars and unfermented residues for the formation of the carbon. In such cases the alcohol formed from the carbohydrate may be led off, and the residue concentrated by the subsequent evaporation of the water by any suitable means. Also, there are cases where alcohol is contained in the original material to be treated. In fact, any method may be used by which a material originally saccharine or similar nitrogenous product capable of carbonization by heat is concentrated by evaporation of the water contained in it. This concentrated material may be placed in a retort that is heated to a point where it is carbonized. Preferably, it is heated not above 325° C. best, approximating this temperature. These materials unless carbonized at a very low temperature foam very badly during the carbonization and have a tendency to be hydroscopic. If retorted at a very high temperature, usually fillers are used to prevent excessive foaming, but I have found that by dehydrating these carbonaceous materials at a temperature of about 325° C. foaming is greatly avoided, no fillers are necessary and the carbonization proceeds at a very rapid rate, the decomposition of nitrogenous materials is avoided, and if I neutralize the materials containing organic acids with an alkali salt, the organic acid salts are dried without decomposition or fusing.

The vapor products of this step are practically low in nitrogen and are principally carbon monoxide, carbon dioxide, etc. The water vapor may be occluded in the heated gases by incompletely dehydrating the mass prior to carbonization.

During this low temperature carbonization, I regulate and control the density, hardness and porosity of the carbon. The material is then ready for the activating step (b). The low temperature carbonization may be performed in the way indicated in my patent granted No. 1,519,932.

The material which is the product of step (a) and which I have referred to in the patents mentioned above has become known in the art as the charred product. It is a carbon containing in it the activating agents that were present in the saccharine or similar nitrogenous materials, which activating materials are consequently distributed minutely through the mass. These activating agents are alkali salts such as potassium or sodium chloride, or combined with organic matter, or sulphate or equivalent salts of alkaline earth metals. During the stage (a) practically these salts form no alkaline carbonates. The mass, however, has been dried and has a great deal of its volatile materials, 25 to 70%, removed from it during the low temperature carbonization of the material. It is not hydroscopic and is homogeneous.

The organic acid salts present in the dehydrated saccharine or similar material are decomposed only at a higher temperature, forming the alkaline carbonate with the liberation of either organic acid or ketones or gases.

In the processes hitherto, where steps (a) and (b) were not separated, many substances contained in the nitrogenous materials have a tendency to fuse at the temperatures most favorable to activation. While the addition of alkaline earth compounds, such as lime, have a tendency to prevent fusion, its addition increases the bulk of the material, and the expenses in the preparation of the final product, because, in such case, the added lime must be removed by inorganic acids. As a consequence, many of these processes were carried out at a temperature unduly low for activation, from 600° to not exceeding 750° C.

The step of carbonization of the product is retarded by a high percentage of the inorganic salts, which are usually contained in the material that is to be carbonized. If these salts were in less quantity the carbonization would be very readily performed, as this process is exothermic above 290° C.

In the activation retorts the heating proceeds very rapidly. Most of the capillary pores had been formed previously in the low temperature carbonizing stage, so that the extensive formation of pores during the activating process and the consequent slow heating used hitherto is not necessary. I have found the best temperature is from 800 to 1250° C. The period of the activation stage depends upon the saccharine material that is utilized.

The higher the ash content, i. e. inorganic salts, provided carbonates are not present in a great excess, the higher the temperature, vice versa. For instance, carbon from beet molasses can be activated at a higher temperature than from cane molasses. However, this is only a general and not a definite rule.

The activating heating is conducted out of contact with the air, and may be done very rapidly.

The use of steam during the activating heating, which is very well known and old in the art of manufacturing activated charcoal, has been proven to be advantageous. It was found to increase the capillarity of the activated carbon. It had the disadvantage, when previously used, in the presence of a high percentage of inorganic salts, of having the tendency to cause the fusion of the inorganic agents. This was previously attempted to be remedied by disadvantageously reducing the temperature of the activation retort, or by introducing the steam near the end of the activating process, or by using alkaline earth salts or a combination of same.

The method I have devised of using water vapor is to use non-condensible gases in which water vapor is mixed. The amount of water vapor varies with the character of the charred material undergoing activation. A practical measure may be reached as follows:—

The higher its ash content, the lower the water content in the non-condensible gases and vice versa. Also the easier is the formation of alkaline carbonate and the greater the dilution with non-condensible gases.

The character of the gases suitable are the non-condensible gases as given off during the low temperature carbonization of the nitrogenous products. I may also include the non-condensable gases from the activating retort, but prefer to use the former as they are cleaner, being produced at a lower temperature. However, other non-condensable gases, such as CO, $CO_2$ and $N_2$ or their combination may be used containing water vapors.

The small amount of water vapor that is desirable in the activating retort and which is furnished by the water vapor in the gases aforesaid is readily contained in such a mixture of gases and water vapor, and the steam is sufficiently diluted to prevent injury to the charred mass, being activated at a high temperature. It may be and in practice is introduced into the activating retort immediately upon the starting of the activation and may be continued throughout the activation.

This gas with mixed vapor I find may be secured in practice most satisfactorily by catching and washing the gases given off from the retort where the low temperature carbonization takes place. Returning to the step (a) where the carbonization of the saccharine or nitrogenous material takes place. The gases given off from the low temperature retort are passed through a scrubber in which the tar and other deleterious products are removed, and in which a quantity of water vapor is taken up by the gases passing through it, depending upon the temperature leaving the scrubbing system. These gases with their water vapor content may then be led into the activating retort.

After the activation is concluded the activated carbon may be broken up, leached in the usual manner, and washed with an inorganic acid, removing the water soluble products from the activated carbon. Various refinements may be made. The heated gases given off from the activating retort after being freed of its valuable constituents may be utilized to heat the carbonizing retort, and the waste heat from the latter to furnish all or a part of the heat in concentrating the saccharine material prior to its carbonization. Various by-products are obtained in practice. In the activating step of my process ammonia, wood alcohol and acetic acid amines, and other vapors are given off and may be collected and, in the leaching of the char, potash salts are recoverable. As an example of a particular case in which my process is used, I add the following:—

100,000 gallons of distillery slop obtained from the fermentation of cane or beet molasses and dealcoholized is concentrated in a suitable evaporator to a density of 35–45 Baumé. The density depends upon the isoelectric condition of the distillery material. The lower the pH the lower the density. I found that the greater the alkalinity the higher concentration can be obtained.

The so concentrated material is now transferred to the low temperature retorts where it is dehydrated and density regulated by the rate of heating to its isoelectric point. The temperature for such dehydration may be 325° C. at which no organic nitrogen is lost. Should the product contain organic acid, such as acetic acid or other organic acid, which may be formed during the fermentation, and be neutralized whereby the acid is present in combination with alkali such as potassium or sodium acetate, then no decomposition will take place at the above temperature.

The porosity, density and hardness of the product is governed by various factors to produce a product which has a hardness like talcum or bone char. This can be accomplished through three factors; through its isoelectric condition, rate of heating and low temperature carbonization.

The charred product, being non-hydroscopic, is now either crushed, partly leached or unleached, transferred into the activating retorts, there it is heated to a temperature between 800–1250° C. until the desired activation has been obtained. While this product is being heated to the above temperature, the vapors given off from the low temperature are tar, and other water soluble products formed during the dehydration. The non-condensable gas saturated with water vapors is now either pre-heated before it enters the high temperature retorts, or may be heated in this retort direct. The large volume of non-condensable gas contains no deleterious products in same, being scrubbed previously, removes tar and other pyroligneous products which may be formed during the dehydration. The water vapors contained in the gas aids the activation and the large volume of non-condensable gases prevent the fusion of the potassium chloride and sulphate or other inorganic salts. During the activation we may form organic acids or drive them out from the neutralized product.

The vapors are scrubbed, preferably with a weak acetic acid solution, which will combine with the ammonia which is the result of the carbonization of the ammonium compounds present such as ammino compounds. The acetic acid combines forming ammonium acetate. I prefer to use a weak acetic acid solution as a scrubbing medium. The temperature of this solution shall be such that the ammonium acetate, which is formed through the combination of acetic acid and ammonium, the latter formed by the decomposition of the organic nitrogenous products during retorting is not decomposed. A temperature not above 55°–70° C. is desirable. A scrubbing liquid such as the above will have no effect upon the other organic compounds formed and condensed in the scrubber. Such products are methyl alcohol, trimethylamine, ketones, etc.

During the carbonization I obtain tar and oils which are removed by any conventional means and used for various purposes. The ammonium acetate solution is treated at a temperature above 65° C. whereby ammonia is given off and the acetic acid solution used again for the above purpose.

The char after being activated is now transferred to the leaching tanks or preferably ground to the desired fineness before being leached with water, whereby I obtain the potassium or other inorganic salts, which after concentration and crystallization are marketed. The leached char is further treated with an inorganic acid such as hydrochloric acid, a usual procedure to remove acid soluble products, and after drying it is suitable for decolorizing purposes.

I claim:—

1. In the art of producing decolorizing charcoal from a nitrogenous waste material, containing a fermentable carbohydrate, the step of fermenting the fermentable portion thereof, concentrating, dehydrating and carbonizing at a temperature of about 325° C. the nitrogenous residue and then activating the charcoal so produced by subjecting it in a retort to a temperature of about 1000° C.

2. The art of producing from a saccharine material containing throughout the mass finely divided particles of salts of alkali or alkaline earth metals, which comprises retorting these materials at a temperature not exceeding 325° C. until such material is dehydrated and carbonized, without the expulsion or the decomposition of such salts, and then separately retorting such carbonized material containing these salts at a temperature of 800° to 1150° C. apart from free oxygen and in the presence of non-condensable gases until these salts are decomposed, and the charcoal thereby activated.

3. The art of producing from a saccharine material containing throughout the mass, finely divided salts of alkali or alkaline earth metals, which comprises retorting these materials at a temperature not exceeding 325° C. until it is dehydrated and carbonized without destroying, removing or substantially decomposing said salts, and then separately retorting the product so produced, apart from free oxygen and in the presence of non-condensable gases containing admixed therewith a small quantity of water vapor.

4. The art of producing from a saccharine material containing throughout the mass, finely divided salts of alkali or alkaline earth metals, containing mixed throughout the mass salts of an alkali or alkaline earth metal which comprises retorting the material at a temperature not exceeding 325° C. with the formation of carbon monoxide and carbon dioxide gas and until the mass is dehydrated and carbonized but still retaining the said salts, then again retorting the material so produced at a temperature approximately 800° to 1150° C. apart from free oxygen until the particles of salts are decomposed and driven off.

5. In the art of producing from a saccharine material containing throughout its mass finely divided particles of the inorganic salts of an alkali and alkaline earth metal wherein these salts are relied on as the activating agencies, and in which the dehydrating and carbonizing process step is carried out at a temperature not exceeding 325° C. with the elimination of ammonia, the step of scrubbing the vapors given off from this phase in a weak acetic acid solution thereby combining the ammonia to form ammonium acetate.

6. In the art of producing from a saccharine material, containing throughout the mass, finely divided salts of alkali or alkaline earth metals, which comprises retorting to carbonization this material at a temperature not exceeding 325° C, with the formation and expulsion of carbon monoxide and carbon dioxide gas, and the retention of said salts substantially unaltered in the mass, and the subsequent retorting of the carbonized mass in the presence of said gases, at a temperature of approximately 800° to 1150° C.

7. In the art of producing from a saccharine material containing throughout its mass finely divided particles of salts of an alkali and an alkaline earth metal; which comprises retorting this material until the same is carbonized at a temperature not exceeding 325° C. with the formation of carbon monoxide and carbon dioxide gas, and the retention of the said salts, in substantially unaltered form, scrubbing said gases, and retorting again the carbonized material apart from free oxygen and in the presence of the scrubbed gas.

8. The process as defined in claim 7 in combination with the additional steps of leading the gases arising from the activating stage to the primary stage and igniting them.

9. The art of producing from saccharine materials containing salts of alkali or alkaline earth metals, finely divided throughout them, which comprises retorting these materials at a temperature not exceeding 325° C. until said materials are dehydrated and carbonized without destroying, removing or substantially decomposing said salts, and then separately retorting the product so produced at a temperature approximating 800° to 1150° C. and apart from free oxygen until these inorganic salts so contained are decomposed and simultaneously expelling these gaseous elements by the use of non-condensable gases, thereby activating the charcoal.

GUSTAVE T. REICH.